(12) United States Patent
Gassend et al.

(10) Patent No.: US 12,140,706 B2
(45) Date of Patent: *Nov. 12, 2024

(54) SYSTEMS AND METHODS FOR MODIFYING LIDAR FIELD OF VIEW

(71) Applicant: Waymo LLC, Mountain View, CA (US)

(72) Inventors: Blaise Gassend, East Palo Alto, CA (US); Stephen Sulack, Sunnyvale, CA (US); Jonathan Souliere, Redwood City, CA (US)

(73) Assignee: Waymo LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/368,928

(22) Filed: Sep. 15, 2023

(65) Prior Publication Data

US 2024/0004039 A1 Jan. 4, 2024

Related U.S. Application Data

(63) Continuation of application No. 18/062,148, filed on Dec. 6, 2022, now Pat. No. 11,762,067, which is a
(Continued)

(51) Int. Cl.
*G01S 7/481* (2006.01)
*G01S 17/10* (2020.01)
*G02B 26/10* (2006.01)

(52) U.S. Cl.
CPC .......... *G01S 7/4817* (2013.01); *G01S 7/4813* (2013.01); *G01S 17/10* (2013.01); *G02B 26/101* (2013.01)

(58) Field of Classification Search
CPC ...... G01S 7/4817; G01S 7/4813; G01S 17/10; G01S 17/42; G01S 17/931; G01S 17/89; G02B 26/101

See application file for complete search history.

(56) References Cited

U.S. PATENT DOCUMENTS 9,285,477 B1 3/2016 Smith et al.
9,869,754 B1 1/2018 Campbell et al.
(Continued)

FOREIGN PATENT DOCUMENTS

EP 2221638 5/2014
JP 2016151519 A 8/2016
(Continued)

OTHER PUBLICATIONS

International Searching Authority, International Search Report and Written Opinion mailed on Dec. 18, 2020, issued in connection with International Patent Application No. PCT/US2020/047133 filed on Aug. 20, 2022, 11 pages.
(Continued)

*Primary Examiner* — Seung C Sohn
(74) *Attorney, Agent, or Firm* — McDonnell Boehnen Hulbert & Berghoff LLP

(57) ABSTRACT

The present disclosure relates to systems, methods, and vehicles that facilitate a light detection and ranging (LIDAR or lidar) system that may take advantage of "dead angles" where the lidar system is oriented toward support structure or another "uninteresting" feature. In such scenarios, light pulses may be redirected toward more-interesting features in the environment. An example system includes a lidar system configured to emit light pulses into an environment of the system so as to provide information indicative of objects within a default field of view. The system also includes a reflective surface optically coupled to the lidar system. The reflective surface is configured to reflect at least a portion of the emitted light pulses so as to provide an extended field of view. The lidar system is further configured to provide information indicative of objects within the extended field of view.

20 Claims, 12 Drawing Sheets

Related U.S. Application Data continuation of application No. 16/569,872, filed on Sep. 13, 2019, now Pat. No. 11,536,807.

(56) References Cited

U.S. PATENT DOCUMENTS

| | | |
|---|---|---|
| 10,151,836 B2 | 12/2018 | O'Keeffe |
| 10,302,746 B2 | 5/2019 | O'Keeffe |
| 10,578,721 B2 | 3/2020 | Jang et al. |
| 10,591,598 B2 | 3/2020 | Jeong et al. |
| 10,942,257 B2 * | 3/2021 | Bao .................... G02B 19/0076 |
| 11,536,807 B2 * | 12/2022 | Gassend ................ G01S 17/42 |
| 2005/0225743 A1 | 10/2005 | Chang et al. |
| 2014/0293263 A1 | 10/2014 | Justice et al. |
| 2016/0377706 A1 | 12/2016 | Keller et al. |
| 2018/0095175 A1 | 4/2018 | O'Keeffe |
| 2018/0188355 A1 | 7/2018 | Bao et al. |
| 2018/0284237 A1 | 10/2018 | Campbell et al. |

FOREIGN PATENT DOCUMENTS

| | | |
|---|---|---|
| JP | 2018084489 A | 5/2018 |
| KR | 1020190084574 | 7/2019 |
| WO | 2018/126248 | 7/2018 |

OTHER PUBLICATIONS

Abiko et al., "Development of Constant Altitude Flight System Using Two Dimensional Laser Range Finder with Mirrors," 2017 IEEE International Conference on Advanced Intelligent Mechatronics (AIM), Munich Germany, Jul. 3-7, 2017, 6 pages.

European Patent Office, Extended European Search Report mailed on Jul. 26, 2023, issued in connection with European Patent Application No. 20862998.0, 14 pages.

Noguchi et al., "Capturing Device for Dense Point Cloud of Indoor People using Horizontal LIDAR and Pan Rotation of Vertical LIDAR with Mirrors," 2012 IOEE/SICE International Symposium on System Integration (SII), Kyushu University, Fukuoka, Japan, Dec. 16-18, 2012, 6 pages.

Velodyne Lidar, "How to Change the Laser Angle and FoV on a Velodyne VLP-16," Oct. 25, 2016, 5 pages, retrieved from internet: https://velodynelidar.com/blog/how-to-change-the-laser-angle-and-fov-on-a-veloydne-vlp-16.

Japanese Patent Office, Notice of Reasons for Rejection mailed on Mar. 29, 2023, issued in connection with Japanese Patent Application No. 2022-510089, 7 pages (with English Translation).

Japanese Patent Office, Notice of Reasons for Rejection mailed on Jul. 22, 2024, issued in connection with Japanese Patent Application No. 2023-185945, 5 pages (with English Translation).

\* cited by examiner

SYSTEMS AND METHODS FOR MODIFYING LIDAR FIELD OF VIEW

CROSS-REFERENCE TO RELATED APPLICATIONS

The present application is a continuation of U.S. patent application Ser. No. 18/062,148, filed Dec. 6, 2022, which is a continuation of U.S. patent application Ser. No. 16/569,872, filed Sep. 13, 2019, the content of which is herewith incorporated by reference.

BACKGROUND

A conventional Light Detection and Ranging (LIDAR or lidar) system may utilize a light-emitting transmitter (e.g., a laser diode) to emit light pulses into an environment. Emitted light pulses that interact with (e.g., reflect from) objects in the environment can be received by a receiver (e.g., a photodetector) of the LIDAR system. Range information about the objects in the environment can be determined based on a time difference between an initial time when a light pulse is emitted and a subsequent time when the reflected light pulse is received.

SUMMARY

The present disclosure generally relates to light detection and ranging (LIDAR or lidar) systems, which may be configured to obtain information about an environment. Such lidar devices may be implemented in vehicles, such as autonomous and semi-autonomous automobiles, trucks, motorcycles, and other types of vehicles that can move within their respective environments.

In a first aspect, a system is provided. The system includes a lidar system configured to emit light pulses into an environment of the system so as to provide information indicative of objects within a default field of view. The lidar system includes a rotatable base configured to rotate about a first axis and a rotatable mirror coupled to the rotatable base. The rotatable mirror is configured to rotate about a second axis. The lidar system also includes at least one light source configured to emit the light pulses. The emitted light pulses interact with the environment to provide return light pulses. The lidar system additionally includes at least one detector configured to detect at least a portion of the return light pulses. The system also includes a reflective surface optically coupled to the lidar system. The reflective surface is configured to reflect at least a portion of the emitted light pulses so as to provide an extended field of view. The lidar system is further configured to provide information indicative of objects within the extended field of view.

In a second aspect, a method is provided. The method includes causing at least one light source of a lidar system to emit light pulses toward a default field of view and toward a reflective surface configured to reflect a portion of the light pulses toward an extended field of view. The lidar system includes a rotatable base configured to rotate about a first axis and a rotatable mirror coupled to the rotatable base. The rotatable mirror is configured to rotate about a second axis. The lidar system also includes at least one light source configured to emit the light pulses. The emitted light pulses interact with the environment to provide return light pulses. The lidar system additionally includes at least one detector configured to detect at least a portion of the return light pulses. The emitted light pulses interact with an environment of the lidar system to provide return light pulses. The method also includes receiving at least a first portion of the return light pulses from the default field of view as a first detected light signal. The method additionally includes receiving at least a second portion of the return light pulses from the extended field of view as a second detected light signal. Yet further, the method includes transmitting point cloud data, wherein the point cloud data is based on the first detected light signal and the second detected light signal, and indicative of objects within the default field of view and the extended field of view.

In a third aspect, a vehicle is provided. The vehicle includes a lidar system configured to emit light pulses into an environment of the vehicle so as to provide information indicative of objects within a default field of view. The lidar system includes a rotatable base configured to rotate about a first axis and a rotatable mirror coupled to the rotatable base. The rotatable mirror is configured to rotate about a second axis. The lidar system also includes at least one light source configured to emit the light pulses. The emitted light pulses interact with the environment to provide return light pulses. The lidar system additionally includes at least one detector configured to detect at least a portion of the return light pulses. The vehicle additionally includes a reflective surface optically coupled to the lidar system. The reflective surface is configured to reflect at least a portion of the emitted light pulses so as to provide an extended field of view. The lidar system is further configured to provide information indicative of objects within the extended field of view.

Other aspects, embodiments, and implementations will become apparent to those of ordinary skill in the art by reading the following detailed description, with reference where appropriate to the accompanying drawings.

DETAILED DESCRIPTION

Figure 1:
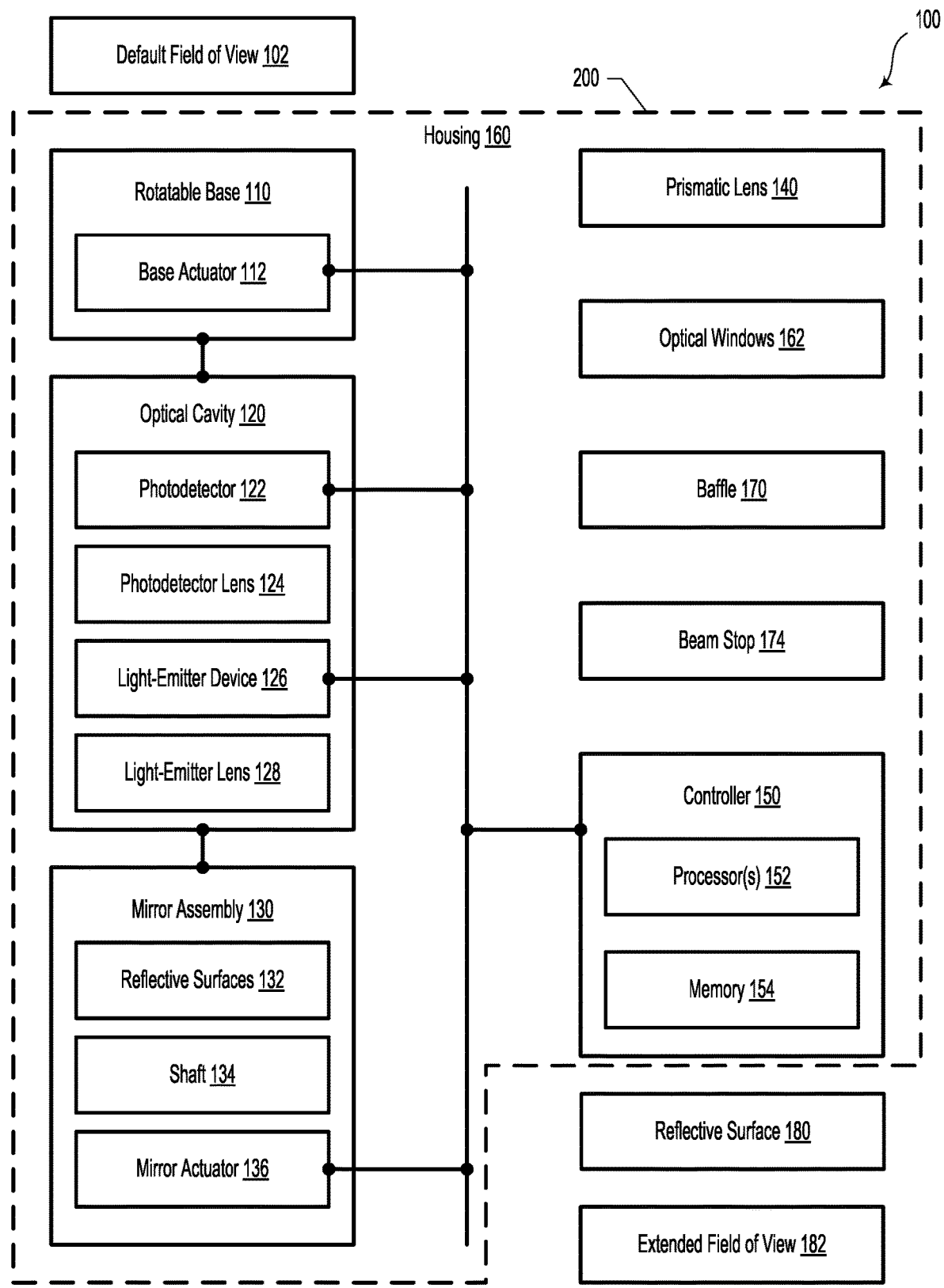
FIG. 1 illustrates a system, according to an example embodiment.

Example methods, devices, and systems are described herein. It should be understood that the words "example"

and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

I. Overview

Autonomous and semi-autonomous vehicles may utilize a three-dimensional (3D) lidar system for navigation by mapping out an environment of the vehicle based on a lidar point map. However, conventional lidars have "blind spots", such as a limited range of elevations it can see down to, potentially leaving a cone or other region below the lidar, which is not scanned.

An example lidar system includes a rotatable mirror assembly and an optical cavity. The optical cavity includes at least one light-emitter device, at least one photodetector, and respective optical elements (e.g., lenses). The light-emitter device may emit light pulses along a light-emission axis that interact with the rotatable mirror assembly so that the light pulses are redirected into an environment. Light pulses that reflect back toward the lidar from the environment can be received by the photodetector along a light-receiving axis so as to determine a distance to target (range) and be used to form a point cloud representing the distance determinations. In some embodiments, the light pulses could be emitted through two windows located at opposing sides of the lidar system housing. While some embodiments may describe sensing devices that utilize light pulses, it will be understood that other types of three-dimensional sensing technologies that utilize continuous wave light (e.g., continuous wave time-of-flight (TOF)) systems are possible and contemplated.

In an example embodiment, the optical cavity could be coupled to a rotatable base, which is configured to rotate about a first axis of rotation that is substantially vertical. The mirror assembly could be configured to rotate about a second axis of rotation that is coincident and substantially perpendicular to the first axis of rotation.

In such lidar systems, segments of a lidar point cloud can fall upon a support structure (e.g., a structure that supports the lidar system on a vehicle) or other features not of interest for the application to which the lidar is being applied. For example, in some scenarios, some light pulses may be directed toward static (e.g., unchanging) or previously characterized portions of the environment of the lidar. As described herein, it is possible to recover useful point cloud information from these "uninteresting" light pulses by redirecting them with a reflective surface or mirror toward a different portion of the environment. As described herein the term "point cloud" could include a visualization of range information provided by the lidar and/or the raw range data itself. It will be understood that, in some embodiments, such range data need not be stored on the lidar device itself and such visualizations need not be provided by the lidar device itself.

Systems and methods described herein may take advantage of "dead angles" where the scanner is looking at a vehicle structure or a support structure. In such scenarios, light pulses may be redirected toward interesting features in the environment.

The lidar system disclosed herein could be used in or with machine vision and/or perception applications. In some embodiments, the lidar system could be utilized for transportation applications (e.g., semi- or fully-autonomous vehicles) or robotic, security, surveying, agricultural, mining, construction, marine, UAV, and/or warehouse-related applications.

II. Example Systems

FIG. 1 illustrates a system 100, according to an example embodiment. The system 100 includes a lidar system 200, which is configured to emit light pulses into an environment of the system so as to provide information indicative of objects within a default field of view 102. The system 100 also includes a reflective surface 180 optically coupled to the lidar system 200. The reflective surface 180 is configured to reflect at least a portion of the emitted light pulses so as to provide an extended field of view 182. The lidar system 200 is further configured to provide information indicative of objects within the extended field of view 182.

While lidar system 200 is described herein as being a laser-based ranging system, it will be understood that other types of three-dimensional sensors could be utilized in system 100. For example, system 100 could be utilized with another type of laser time-of-flight system, stereo cameras, or a camera with texture projectors.

In some example embodiments, lidar system 200 could include a rotatable base 110 configured to rotate about a first axis. The rotatable base 110 could include, or could be coupled to, a base actuator 112. In some embodiments, the base actuator 112 could be a brushless motor, a direct current (DC) motor, or another type of rotational actuator. In some examples, the rotatable base 110 could be configured to rotate about the first axis at between 200 revolutions per minute (RPM) and 800 RPM. It will be understood that the rotatable base 110 could operate at other rotational speeds. In some embodiments, the base actuator 112 could be controlled by the controller 150 to rotate at a desired rotational speed. In some embodiments, lidar system 200 need not include a rotatable base. In such scenarios, one or more elements of the lidar system 200 may be arranged with respect to the first axis. However, in such cases, elements of the lidar system 200 need not rotate about the first axis. Accordingly, in such embodiments, lidar system 200 could be utilized in line-scanning applications, among other possibilities.

lidar system 200 also includes a mirror assembly 130. The mirror assembly 130 is configured to rotate about a second axis. In such scenarios, the second axis could be substantially perpendicular to the first axis (e.g., within 0 to 10 degrees of perpendicular). In some embodiments, the mirror assembly 130 includes a plurality of reflective surfaces 132. Additionally, the mirror assembly 130 could include a shaft 134 and a multi-sided mirror that is configured to mount the plurality of reflective surfaces 132. The mirror assembly 130 could also include a mirror actuator 136, which could be a brushless motor, a DC motor, or another type of rotational actuator. In such scenarios, the mirror actuator 136 is coupled to the shaft 134. In some embodiments, the mirror actuator 136 could be configured to rotate the multi-sided mirror about the second axis at a rotational speed between 20,000 RPM and 40,000 RPM. It will be understood that the mirror actuator 136 could be operated at various rotational speeds or a desired rotational speed, which could be controlled by the controller 150.

In such scenarios, the plurality of reflective surfaces 132 could include three reflective surfaces arranged symmetrically about the second axis such that at least a portion of the mirror assembly 130 has a triangular prism shape. It will be understood that the mirror assembly 130 could include more or less than three reflective surfaces. Accordingly, the mirror assembly 130 could be shaped as a multi-sided prism shape having more or less than three reflective surfaces. For example, the mirror assembly 130 could have four reflective surfaces. In such scenarios, the mirror assembly 130 could have a square or rectangular cross-section.

lidar system 200 additionally includes an optical cavity 120 coupled to the rotatable base 110. In such scenarios, the optical cavity 120 includes a photodetector 122 and a photodetector lens 124 that are arranged so as to define a light-receiving axis. As such, an arrangement of the photodetector 122 and the photodetector lens 124 provide the light-receiving axis. In some embodiments, the photodetector 122 comprises a silicon photomultiplier (SiPM). However, other types of photodetectors, such as avalanche photodiodes (APDs) are contemplated. Furthermore, while photodetector 122 is described in the singular sense herein, it will be understood that systems incorporating multiple photodetectors, such as a focal plane array, are also possible and contemplated.

In example embodiments, the photodetector 122 could provide an output signal to the controller 150. For example, the output signal could include information indicative of a time of flight of a given light pulse toward a given portion of the field of view of the environment. Additionally or alternatively, the output signal could include information indicative of at least a portion of a range map or point cloud of the environment.

The lidar system 200 also includes a light-emitter device 126 and a light-emitter lens 128 that are arranged so as to define a light-emission axis. The light-emitter device 126 could include a laser diode or another type of light-emitter. In some embodiments, the light-emitter device 126 could be coupled to a laser pulser circuit operable to cause the light-emitter device 126 to emit one or more laser light pulses. In such scenarios, the laser pulser circuit could be coupled to a trigger source, which could include controller 150. The light-emitter device 126 could be configured to emit infrared laser light (e.g., having a wavelength between 800-1600 nanometers). However, other wavelengths of light are possible and contemplated. Furthermore, it will be understood that sensing technologies utilizing non-pulsed (e.g., continuous wave) illumination are also contemplated. For example, frequency-modulated continuous wave (FM-CW) and continuous wave time-of-flight (CW-TOF) systems are possible within the scope of the present disclosure.

In some embodiments, the light-emitter device 126 is configured to emit light pulses (by way of light-emitter lens 128) that interact with the mirror assembly 130 such that the light pulses are redirected toward an environment (e.g., an external environment of a vehicle). In such scenarios, at least a portion of the light pulses are reflected back toward the lidar system 200 and received by the photodetector 122 (by way of photodetector lens 124) so as to determine at least one of a range or a point cloud.

At least one light source (e.g., the light-emitter device 126) of the lidar system 200 could be configured to emit light pulses. The emitted light pulses interact with the environment to provide return light pulses. At least one detector (e.g., the photodetector 122) of the lidar system 200 could be configured to detect at least a portion of the return light pulses.

The lidar system 200 includes a controller 150. The controller 150 includes at least one of a field-programmable gate array (FPGA) or an application-specific integrated circuit (ASIC). Additionally or alternatively, the controller 150 may include one or more processors 152 and a memory 154. The one or more processors 152 may be a general-purpose processor or a special-purpose processor (e.g., digital signal processors, etc.). The one or more processors 152 may be configured to execute computer-readable program instructions that are stored in the memory 154. As such, the one or more processors 152 may execute the program instructions to provide at least some of the functionality and operations described herein.

The memory 154 may include, or take the form of, one or more computer-readable storage media that may be read or accessed by the one or more processors 152. The one or more computer-readable storage media can include volatile and/or non-volatile storage components, such as optical, magnetic, organic or other memory or disc storage, which may be integrated in whole or in part with at least one of the one or more processors 152. In some embodiments, the memory 154 may be implemented using a single physical device (e.g., one optical, magnetic, organic or other memory or disc storage unit), while in other embodiments, the memory 154 can be implemented using two or more physical devices.

As noted, the memory 154 may include computer-readable program instructions that relate to operations of lidar system 200. As such, the memory 154 may include program instructions to perform or facilitate some or all of the functionalities described herein.

As an example, the operations could include causing the at least one light source (e.g., light-emitter device 126) to emit one or more light pulses.

The operations could additionally include receiving at least a first portion of the return light pulses from the default field of view 102 as a first detected light signal.

The operations may further include receiving at least a second portion of the return light pulses from the extended field of view 182 as a second detected light signal.

The operations yet further include determining, based on the first detected light signal and the second detected light signal, a point cloud indicative of objects within the default field of view 102 and the extended field of view 182.

Additionally, the operations could include receiving a reflection map. As an example, the reflection map could include reflection information about how the reflective surface 180 reflects the light pulses into the extended field of view 182. In such scenarios, determining the point cloud is further based on the reflection map.

As an example embodiment, the reflection information could include at least one of: an angle of the reflective surface 180, a pose or orientation of the reflective surface 180, or a surface curvature of the reflective surface 180. Additionally or alternatively, the reflection information could include a look up table (LUT). In such scenarios, the LUT could include information indicative of: a default light pulse emission vector and a reflected light pulse emission vector.

In various embodiments, the lidar system 200 includes a housing 160 having a plurality of optical windows 162. The optical windows 162 could be substantially transparent to wavelengths of light such as the emitted light pulses. For example, the optical windows 162 could include transparent materials configured to transmit the emitted light pulses with a transmission efficiency greater than 80%. In some embodiments, the housing 160 could include two elongate optical windows. The optical windows 162 could be arranged on substantially opposite surfaces of the housing 160. In such scenarios, the light pulses could be emitted toward the environment by optical transmission through the plurality of optical windows 162.

In some embodiments, the lidar system 200 could include a prismatic lens 140 configured to refract the light pulses. The prismatic lens 140 could include an optical element (e.g., a prism lens). In some embodiments, the prismatic lens 140 could cause the light emitted from the optical cavity to be refracted at a different angle from the axis of the optical cavity. In such a manner, the optical axis of the beam coming out of the cavity itself can be decoupled from the angle of the optical cavity. Utilizing one or more prismatic lenses 140 could provide a shifted field of view to be asymmetric without having to adjust the optical cavity angle by the same amount. Thus, the prismatic lens 140 could provide the flexibility of smaller package size. For example, in some embodiments, the optical cavity 120 could remain substantially vertical, but the beam emitted by the optical cavity 120 could be angled. Accordingly, optical cavities 120 that utilize prismatic lenses could provide benefits of an asymmetric field of view without widening, or otherwise physically rearranging, the space occupied by the optical cavity 120. In example embodiments, the prismatic lens 140 could replace the light-emitter lens 128. In other embodiments, the prismatic lens 140 could be utilized in addition to the light-emitter lens 128.

In some embodiments, a prismatic lens 140 could be utilized in place of the photodetector lens 124 or in conjunction with the photodetector lens 124. For example, the prismatic lens 140 could be used along the light-receiving axis 125 so as to modify the field of view from which light pulses could be received.

Additionally or alternatively, the light pulses emitted or transmitted through the plurality of optical windows 162 could form an asymmetric light emission pattern in the environment. For example, the light pulses emitted through a first window of the plurality of windows are emitted within a first emission angle range, and wherein the light pulses emitted through a second window of the plurality of windows are emitted within a second emission angle range, wherein the asymmetric light emission pattern is provided by the first emission angle range being different from the second emission angle range.

In some embodiments, the extended field of view 182 and the default field of view 102 are not fully overlapping. For example, the default field of view 102 may include an angled annular region substantially centered about the first axis of lidar system 200. The default field of view 102 could include an elevation angle range between 2 degrees above the horizon and 18 degrees below the horizon in the scenario where the first axis is arranged perpendicular to the horizon (e.g., vertically). It will be understood that other orientations, geometries, and shapes of the default field of view 102 are possible and contemplated.

The extended field of view 182 could include a region directed downward and/or upward with respect to the first axis of the lidar system 200. In some embodiments, the extended field of view 182 includes regions that are not coextensive with the default field of view 102. In such scenarios, the extended field of view 182 could provide a larger overall region in which the lidar system 200 could detect objects. For example, the default field of view 102 could define at least one blind region. In such situations, the extended field of view 182 could overlap with at least a portion of the at least one blind region.

Additionally or alternatively, the extended field of view 182 could include regions that are coextensive with the default field of view. In such scenarios, the coextensive portions of the extended field of view 182 and the default field of view 102 could provide higher rate and/or higher resolution detection of objects by the lidar system 200.

In some embodiments, the reflective surface 180 could include at least one of: a flat mirror, a convex mirror, a concave mirror, or a multifaceted mirror array. Other types of reflective materials and/or surfaces are possible and contemplated. In some embodiments, the reflective surface 180 could include a flat mirror having a flatness of between $\lambda$ and $\lambda/100$ as measured with an optical interference technique, where the light pulses emitted by the light-emitter device 126 include a wavelength, $\lambda$.

In various embodiments, the lidar system 200 could include at least one baffle 170. In such scenarios, the at least one baffle 170 could be configured to reduce stray light within the optical cavity 120. In an example embodiment, the baffle 170 could include an optically-opaque material disposed between the light-receiving axis and the light-emission axis.

The lidar system 200 also includes at least one beam stop 174. The beam stop 174 may be optically opaque and could be configured to block light beams from being emitted toward the optical windows 162 and/or toward the environment. In some embodiments, the beam stop 174 may be arranged within the housing 160 substantially opposite the optical cavity 120.

When light emitted from the optical cavity 120 interacts with a corner of the mirror assembly 130 (e.g., at an intersection between two different reflective surfaces 132), the light is split into two parts, one emitted forward (e.g., toward a first optical window), and one emitted backward (e.g., toward a second optical window). To avoid ambiguous lidar signals due to the two emitted pulses, the beam stop 174 may be arranged near the top of the field of view so as to block at least one of the two beams from being emitted toward the environment. Furthermore, by adjusting the beam stop 174, the field of view at the top of one side can be expanded or extended at the expense of the field of view near the top of the other side.

In such scenarios, by adjusting the top beam stop position, the field of view can be distributed between the two sides at the bottom and top of the field of view respectively.

Figure 2A:
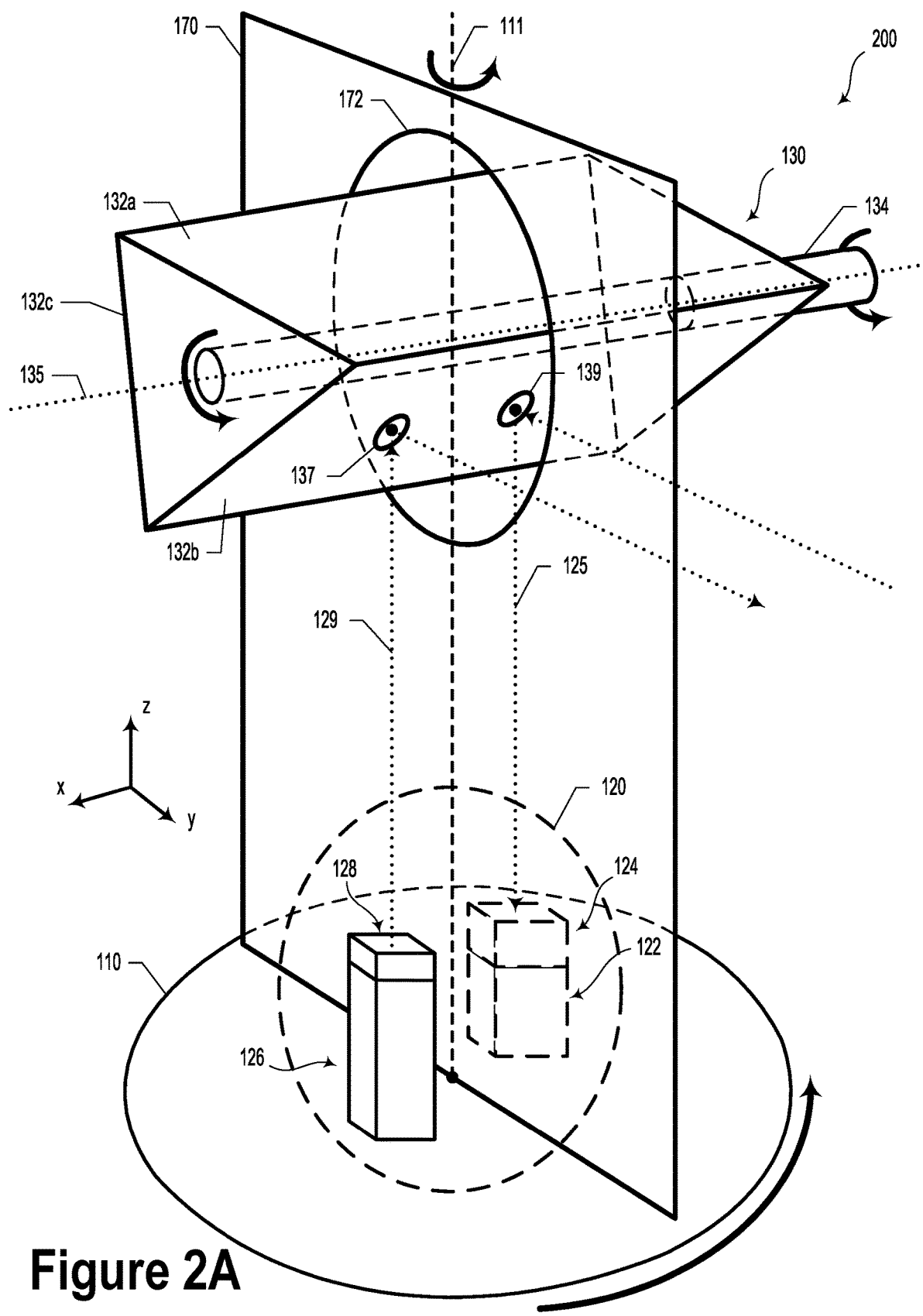
FIG. 2A illustrates a lidar system, according to an example embodiment.

FIGS. 2A, 2B, 2C, and 2D illustrates various views and portions of lidar system 200. FIG. 2A illustrates an oblique view of lidar system 200, according to an example embodiment. As illustrated, lidar system 200 could include a rotatable base 110. The rotatable base 110 could be configured to rotate about first axis 111. Furthermore, lidar system 200 could include an optical cavity 120, which could include light-emitter device 126, light-emitter lens 128, photodetector 122, and photodetector lens 124. Furthermore, in some embodiments, lidar system 200 could include a mirror assembly 130. The mirror assembly 130 could include a plurality of reflective surfaces 132a, 132b, and 132c and a shaft 134. The mirror assembly 130 could be configured to rotate about second axis 135.

In some embodiments, the light-emitter device 126 and the light-emitter lens 128 could form a light-emission axis 129. Light pulses emitted by the light-emitter device 126 could interact with reflective surface 132b at a transmission mirror region 137.

In some embodiments, the photodetector 122 and the photodetector lens 124 could form a light-receiving axis 125. Light pulses emitted by the light-emitter device 126 could be reflected or otherwise interact with the environment and could be observed at the photodetector 122 by way of a receiving mirror region 139.

As illustrated in FIG. 2, lidar system 200 could include a baffle 170. The baffle 170 could include an opening 172 within which the mirror assembly 130 could be disposed. The opening 172 could be shaped so as to provide freedom for the mirror assembly 130 to rotate about the second axis 135.

Figure 2B:
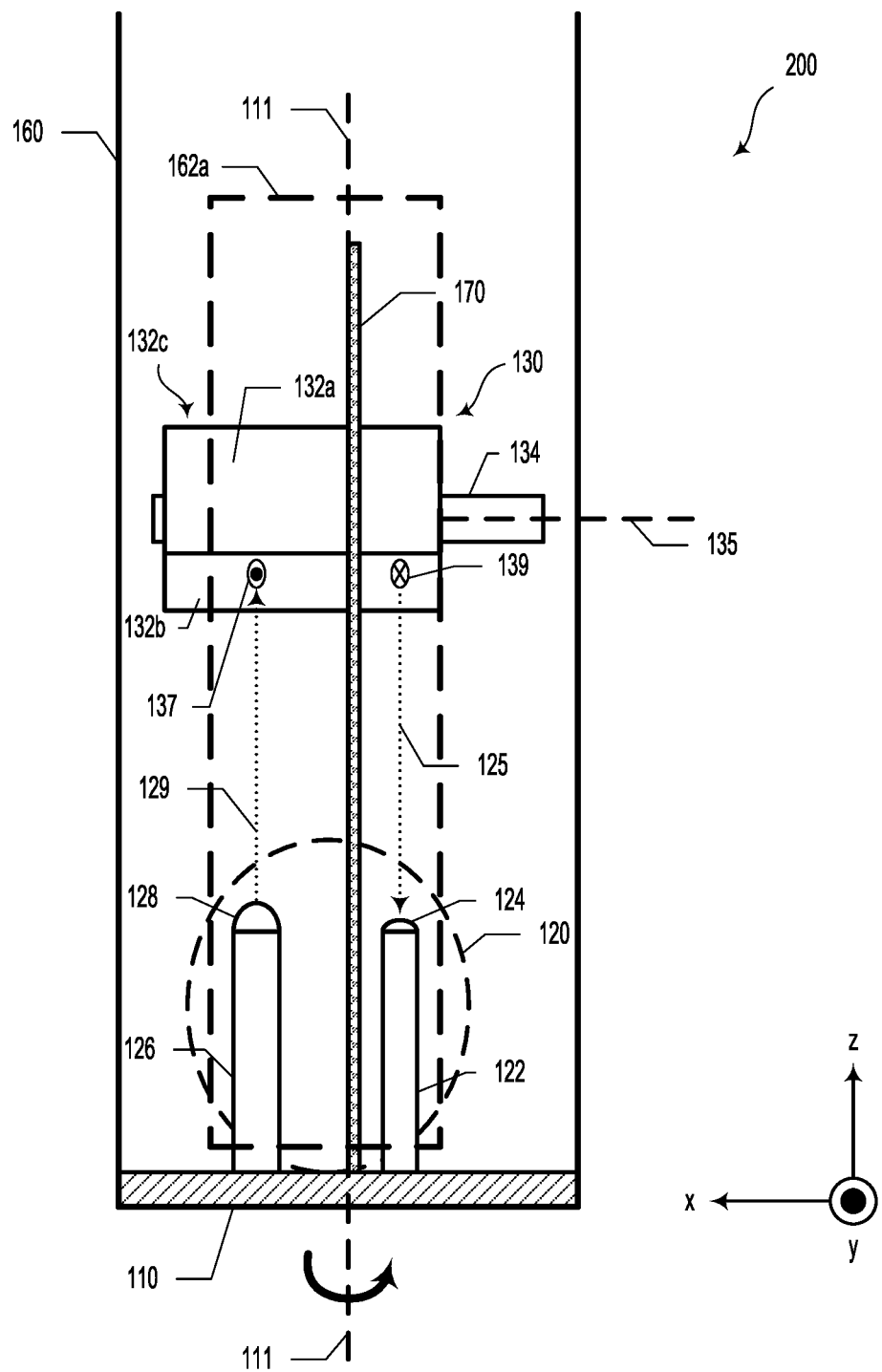
FIG. 2B illustrates a lidar system, according to an example embodiment.

FIG. 2B illustrates a side view of the lidar system 200 along the −y direction, according to an example embodiment. As well as other elements described above in reference to FIG. 2A, lidar system 200 could additionally include a housing 160 and a plurality of optical windows, such as optical window 162a.

Figure 2C:
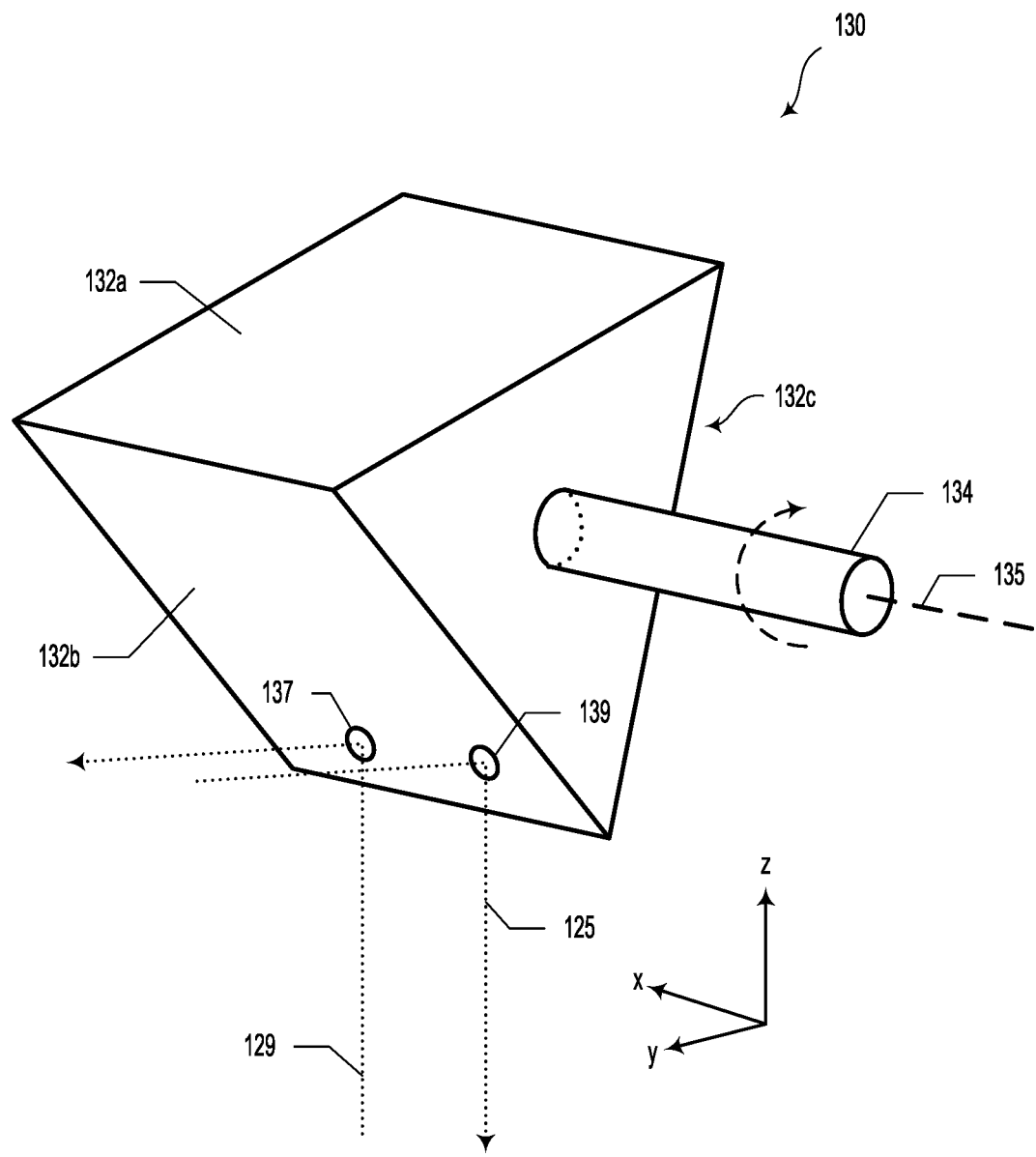
FIG. 2C illustrates a portion of the lidar system of FIG. 2A, according to an example embodiment.

FIG. 2C illustrates a mirror assembly 130 of the lidar system 200, according to an example embodiment. For example, mirror assembly 130 could include a plurality of reflective surfaces 132a, 132b, and 132c. The mirror assembly 130 could additionally include a shaft 134, which could be configured to rotate about second axis 135.

In some embodiments, the light-emitter device 126 could emit light pulses toward the mirror assembly 130 along a light-emission axis 129. A reflective surface 132b of the mirror assembly 130 could reflect such light pulses at a transmission mirror region 137 such that the light pulses are transmitted toward an external environment.

In such examples, light from the environment (e.g., reflected light pulses) could be reflected by the reflective surface 132b of the mirror assembly 130 at a receiving mirror region 139. In some embodiments, the received light could be directed along light-receiving axis 125 toward the photodetector 122.

Figure 2D:
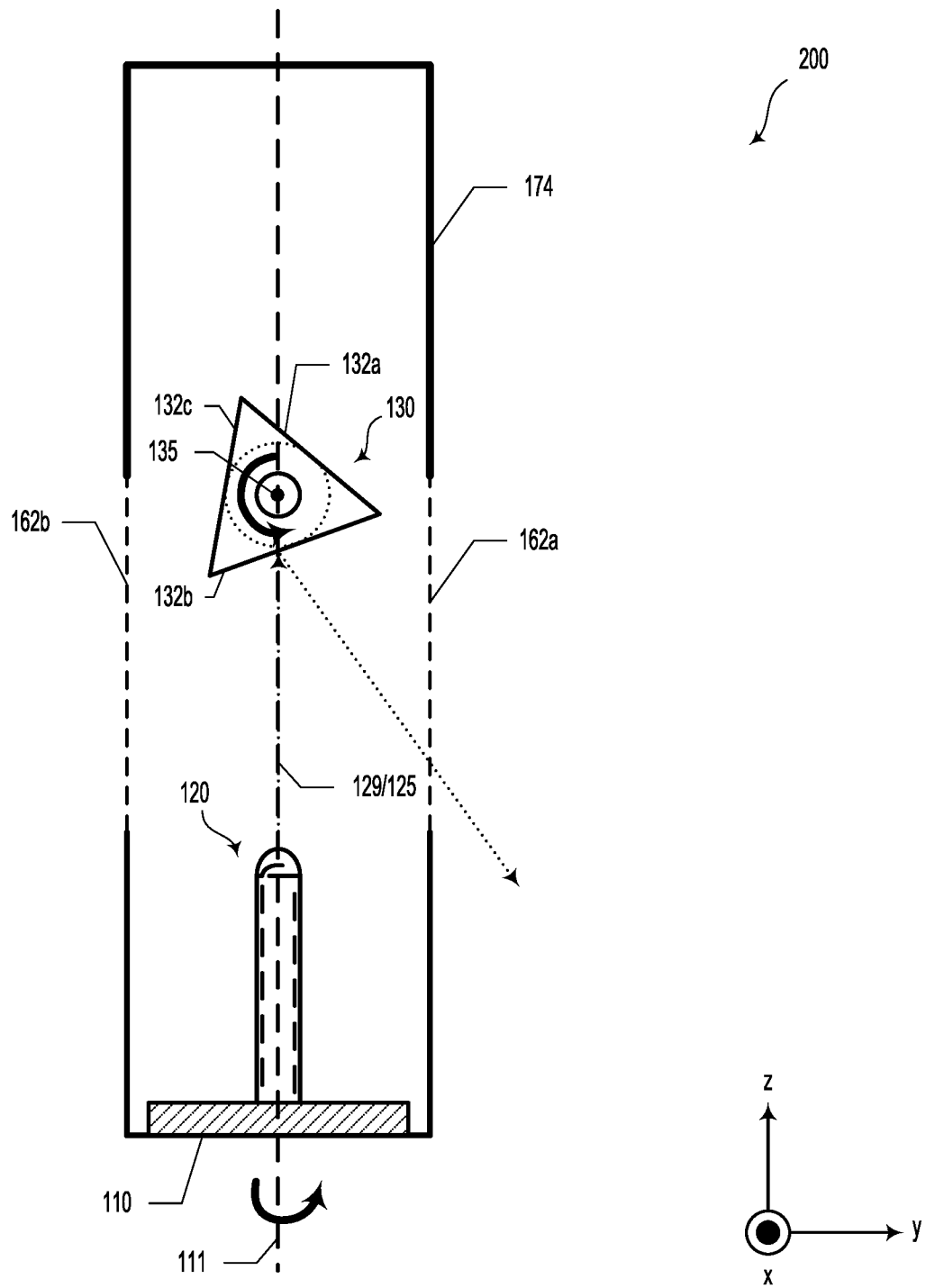
FIG. 2D illustrates a lidar system, according to an example embodiment.

FIG. 2D illustrates a view of the lidar system 200 along the −x direction, according to an example embodiment. The lidar system 200 could include the optical cavity 120 as being disposed such that light-emission axis 129 and/or light-receiving axis 125 are substantially parallel with the first axis 111.

In some embodiments, such an arrangement of the optical cavity 120 with respect to the first axis 111 could provide a substantially symmetric emission pattern in an external environment at least because light pulses emitted by the light-emitter device 126 are equally likely to be transmitted through a first optical window 162a to the right (+y direction) or through the second optical window 162b to the left (−y direction) based on the rotational position of the mirror assembly 130.

Figure 3:
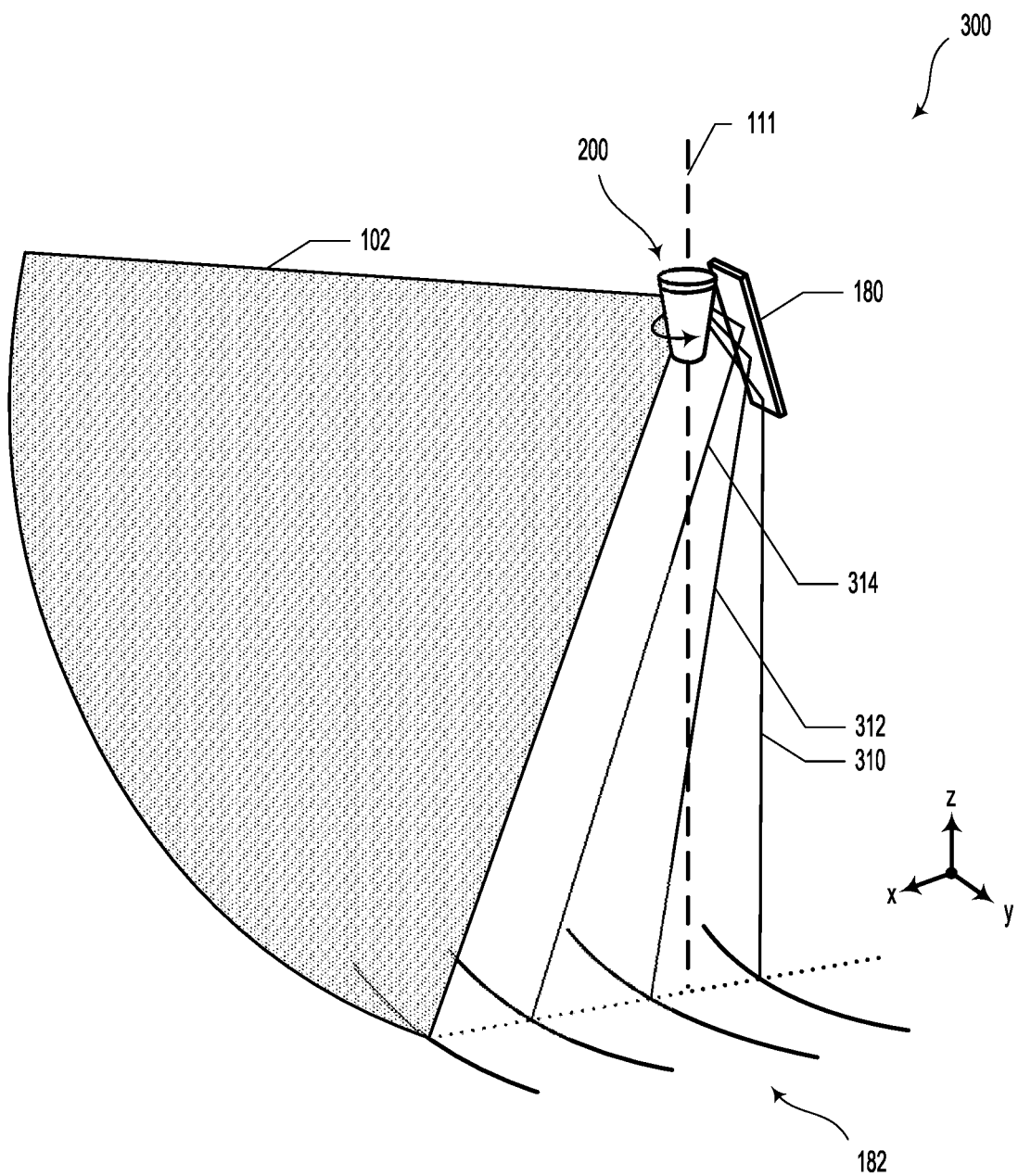
FIG. 3 illustrates a system, according to an example embodiment.

FIG. 3 illustrates a system 300, according to an example embodiment. In some embodiments, system 300 could be similar or identical to system 100, as illustrated and described in reference to FIG. 1. System 300 includes a lidar system 200, as illustrated and described in reference to FIG. 2. System 300 also includes a reflective surface 180. As illustrated in FIG. 3, the reflective surface 180 could include a planar surface (e.g., a flat mirror). However, other types of surfaces configured to reflective light pulses emitted by the lidar system 200 are possible and contemplated. In some embodiments, the reflective surface 180 could be disposed within two feet of the lidar system 200. However, the reflective surface 180 could be disposed nearer to or farther from the lidar system 200. Furthermore, although FIG. 3 illustrates the reflective surface 180 as being separate from the lidar system 200, it will be understood that in some embodiments, the reflective surface 180 could be incorporated into the lidar system 200.

In some embodiments, the lidar system 200 could be configured to emit light pulses that do not interact with the reflective surface 180 so as to provide a default field of view 102. Furthermore, the lidar system 200 could be configured to emit light pulses that interact with the reflective surface 180 so as to provide an extended field of view 182. As illustrated, in some embodiments, the extended field of view 182 could include a region substantially below (e.g., along the −z direction) relative to the lidar system 200 along the first axis 111.

In some embodiments, the reflective surface 180 may represent a structural support for the lidar system 200 on a vehicle, such as a mount or bracket, or a portion thereof. The reflective surface 180 could include another type of static feature that would not normally represent an interesting object within the field of view. In such a scenario, the extended field of view 182 could provide extended coverage for the lidar system 200 while more efficiently utilizing light pulses that may have otherwise been ignored. That is, light pulses that would have otherwise reflected back to the lidar system 200 from a static support structure or mount, can be diverted toward the extended field of view 182, which may include interesting objects or other types of features (e.g., obstacles, etc.). As illustrated in FIG. 3, the extended field of view 182 could effectively include an area directly under the lidar system 200. In such scenarios, lidar system 200 could be configured to detect objects in the extended field of view 182 so as to sense pedestrians, a ground surface, and/or other types of features.

As illustrated in FIG. 3, the lidar system 200 could emit light pulses that interact with the reflective surface 180 so as to provide a plurality of reflected light pulse emission vectors 310, 312, and 314. The reflected light pulse emission vectors 310, 312, and 314 could form at least a portion of the extended field of view 182. While three reflected light pulse emission vectors are illustrated, it will be understood that more reflected light pulse emission vectors are possible and contemplated.

Figure 4:
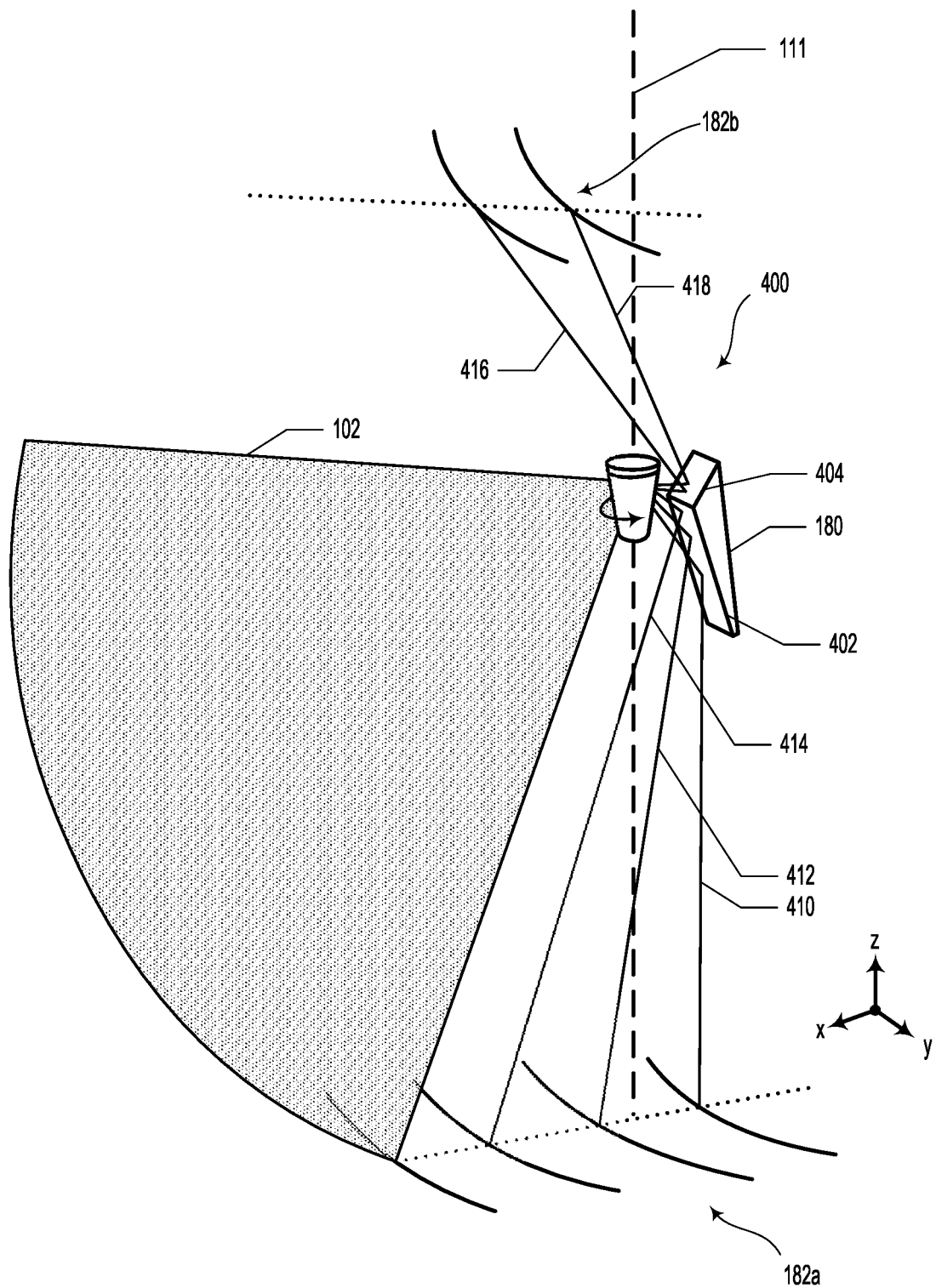
FIG. 4 illustrates a system, according to an example embodiment.

FIG. 4 illustrates a system 400, according to an example embodiment. In some embodiments, system 400 could be similar or identical to system 100 and system 300, as illustrated and described in reference to FIG. 1 and FIG. 3. System 400 includes a lidar system 200, as illustrated and described in reference to FIG. 2. System 400 also includes a reflective surface 180. As illustrated in FIG. 4, the reflective surface 180 could include a plurality of surfaces. For example, the plurality of surfaces could include a first reflective surface 402 and a second reflective surface 404. Other types of surfaces configured to reflective light pulses emitted by the lidar system 200 are possible and contemplated.

In some embodiments, the lidar system 200 could be configured to emit light pulses that do not interact with the reflective surface 180 so as to provide a default field of view 102. Furthermore, the lidar system 200 could be configured to emit light pulses that interact with first reflective surface 402 so as to provide an extended field of view 182a. As illustrated, in some embodiments, the extended field of view 182a could include a region substantially below (e.g., along the −z direction) relative to the lidar system 200 along the first axis 111.

Additionally, the lidar system 200 could be configured to emit light pulses that interact with second reflective surface 404 so as to provide an extended field of view 182b. As illustrated, in some embodiments, the extended field of view 182b could include a region substantially above (e.g., along the +z direction) relative to the lidar system 200 along the first axis 111.

In some scenarios, the extended fields of view 182a and 182b could provide extended coverage for the lidar system 200 while more efficiently utilizing light pulses that may have otherwise been ignored. That is, light pulses that would have otherwise reflected back to the lidar system 200 to indicate a static support structure or mount, can be diverted toward the extended fields of view 182a or 182b, which may include information about obstacles, other vehicles, pedestrians, or other types of features. As illustrated in FIG. 4, the extended field of view 182a could effectively include an area directly under the lidar system 200 and the extended field of view 182b could effectively include an area directly over the lidar system 200. In such scenarios, lidar system 200 could be configured to detect objects in the extended fields of view 182a and 182b so as to sense pedestrians, a ground surface, and/or other types of features.

As illustrated in FIG. 4, the lidar system 200 could emit light pulses that interact with the reflective surface 402 so as to provide a plurality of reflected light pulse emission vectors 410, 412, and 414. The reflected light pulse emission vectors 410, 412, and 414 could form at least a portion of the extended field of view 182a. Additionally, the lidar system 200 could emit light pulses that interact with the reflective surface 404 so as to provide a plurality of reflected light pulse emission vectors 416 and 418. The reflected light pulse emission vectors 416 and 418 could form at least a portion of the extended field of view 182b.

III. Example Vehicles

FIGS. 5A, 5B, 5C, 5D, and 5E illustrate a vehicle 500, according to an example embodiment. The vehicle 500 could be a semi- or fully-autonomous vehicle. While FIGS. 5A-5E illustrate vehicle 500 as being an automobile (e.g., a passenger van), it will be understood that vehicle 500 could include another type of autonomous vehicle, robot, or drone that can navigate within its environment using sensors and other information about its environment.

The vehicle 500 may include one or more sensor systems 502, 504, 506, 508, and 510. In some embodiments, sensor systems 502, 504, 506, 508, and 510 could include lidar sensors having a plurality of light-emitter devices arranged over a range of angles with respect to a given plane (e.g., the x-y plane).

One or more of the sensor systems 502, 504, 506, 508, and 510 may be configured to rotate about an axis (e.g., the z-axis) perpendicular to the given plane so as to illuminate an environment around the vehicle 500 with light pulses. Based on detecting various aspects of reflected light pulses (e.g., the elapsed time of flight, polarization, intensity, etc.), information about the environment may be determined.

In an example embodiment, sensor systems 502, 504, 506, 508, and 510 may be configured to provide respective point cloud information that may relate to physical objects within the environment of the vehicle 500. While vehicle 500 and sensor systems 502, 504, 506, 508, and 510 are illustrated as including certain features, it will be understood that other types of sensor systems are contemplated within the scope of the present disclosure.

An example embodiment may include a system having a plurality of light-emitter devices. The system may include a transmit block of a lidar device. For example, the system may be, or may be part of, a lidar device of a vehicle (e.g., a car, a truck, a motorcycle, a golf cart, an aerial vehicle, a boat, etc.). Each light-emitter device of the plurality of light-emitter devices is configured to emit light pulses along a respective beam elevation angle. The respective beam elevation angles could be based on a reference angle or reference plane. As an example, the reference plane may be based on an axis of motion of the vehicle 500. Other reference angles (e.g., an angle of azimuth, elevation, etc.) or reference planes (e.g., x, y, and z planes) are contemplated and possible within the scope of the present disclosure.

While lidar systems with single light-emitter devices are described and illustrated herein, lidar systems with multiple light-emitter devices (e.g., a light-emitter device with multiple laser bars on a single laser die) are also contemplated. For example, light pulses emitted by one or more laser diodes may be controllably directed about an environment of the system. The angle of emission of the light pulses may be adjusted by a scanning device such as, for instance, a mechanical scanning mirror and/or a rotational motor. For example, the scanning devices could rotate in a reciprocating motion about a given axis and/or rotate about a vertical axis. In another embodiment, the light-emitter device may emit light pulses towards a spinning prism mirror, which may cause the light pulses to be emitted into the environment based on an angle of the prism mirror angle when interacting with each light pulse. Additionally or alternatively, scanning optics and/or other types of electro-opto-mechanical devices are possible to scan the light pulses about the environment.

In some embodiments, a single light-emitter device may emit light pulses according to a variable shot schedule and/or with variable power per shot, as described herein. That is, emission power and/or timing of each laser pulse or shot may be based on a respective elevation angle of the shot. Furthermore, the variable shot schedule could be based on providing a desired vertical spacing at a given distance from the lidar system or from a surface (e.g., a front bumper) of a given vehicle supporting the lidar system. As an example, when the light pulses from the light-emitter device are directed downwards, the power-per-shot could be decreased due to a shorter anticipated maximum distance to target. Conversely, light pulses emitted by the light-emitter device at an elevation angle above a reference plane may have a relatively higher power-per-shot so as to provide sufficient signal-to-noise to adequately detect pulses that travel longer distances.

In some embodiments, the power/energy-per-shot could be controlled for each shot in a dynamic fashion. In other embodiments, the power/energy-per-shot could be controlled for successive set of several pulses (e.g., 10 light pulses). That is, the characteristics of the light pulse train could be changed on a per-pulse basis and/or a per-several-pulse basis.

While FIGS. 5A-5E illustrates various lidar sensors attached to the vehicle 500, it will be understood that the vehicle 500 could incorporate other types of sensors, such as a plurality of optical systems (e.g., cameras), radars, or ultrasonic sensors.

In an example embodiment, vehicle 500 could include a lidar system (e.g., lidar system 200) configured to emit light pulses into an environment of the vehicle 500 so as to provide information indicative of objects within a default field of view.

Yet further, the vehicle 500 includes a reflective surface (e.g., reflective surfaces 180a and 180b) that is optically coupled to the lidar system. In such scenarios, the reflective surface is configured to reflect at least a portion of the emitted light pulses so as to provide an extended field of view. The lidar system is further configured to provide information indicative of objects within the extended field of view.

Figure 5A:
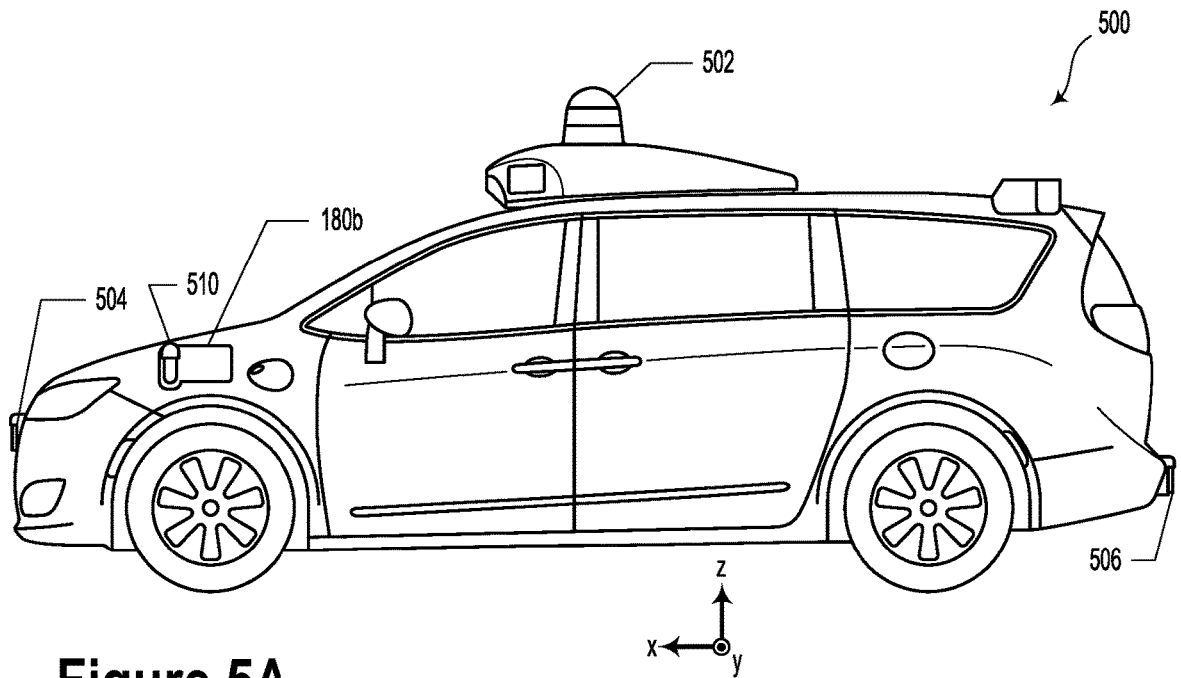
FIG. 5A illustrates a vehicle, according to an example embodiment.
Figure 5B:
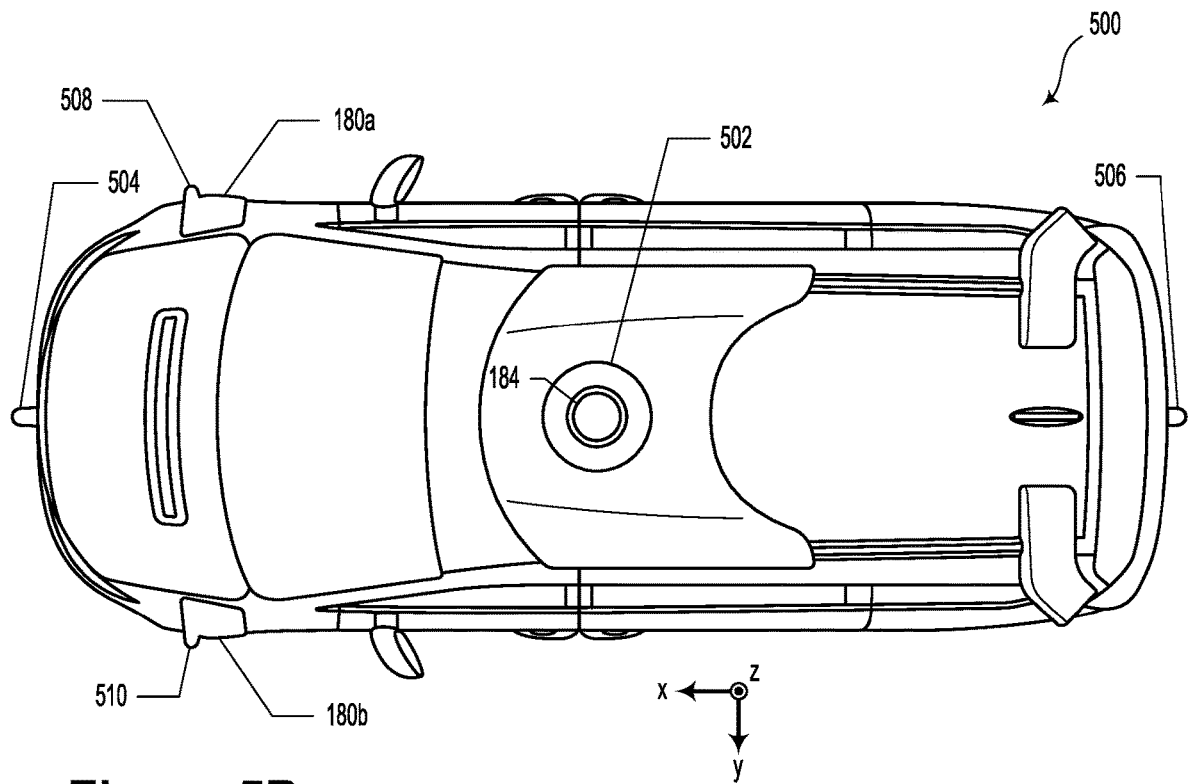
FIG. 5B illustrates a vehicle, according to an example embodiment.
Figure 5C:
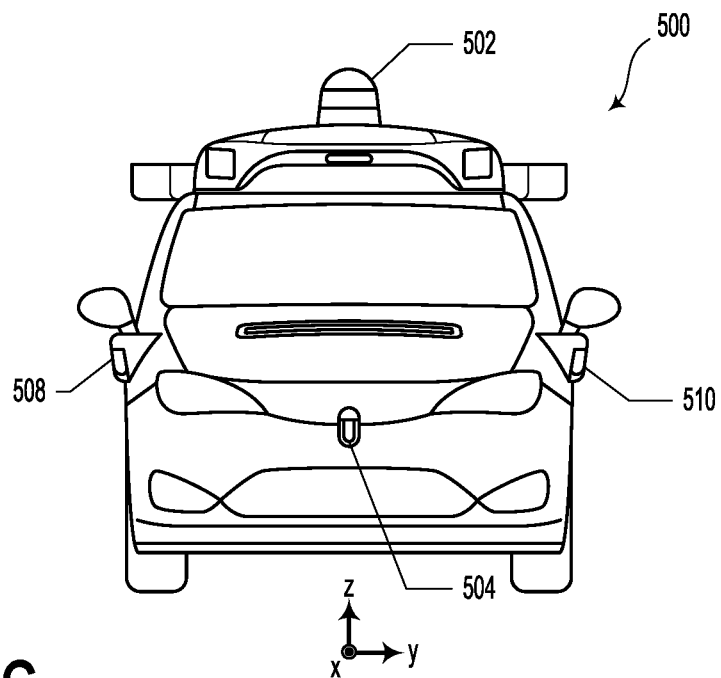
FIG. 5C illustrates a vehicle, according to an example embodiment.
Figure 5D:
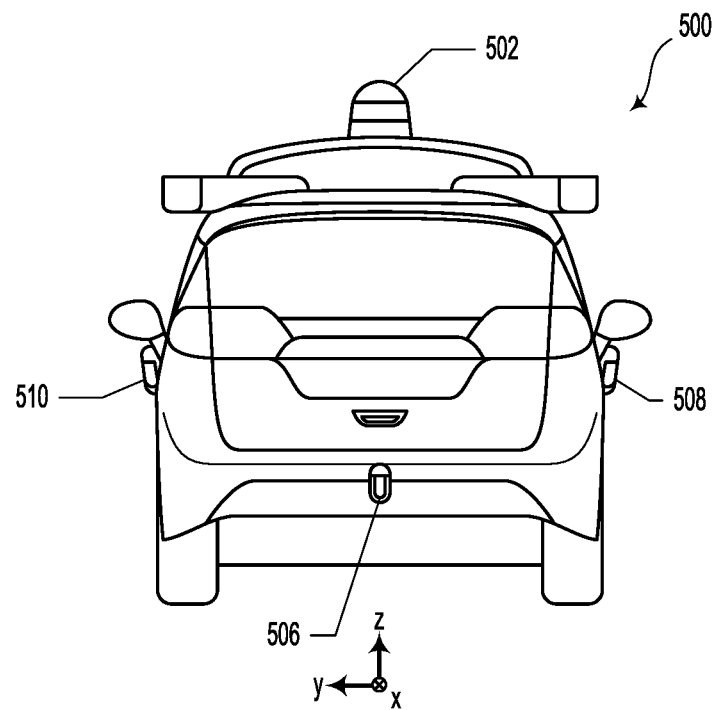
FIG. 5D illustrates a vehicle, according to an example embodiment.
Figure 5E:
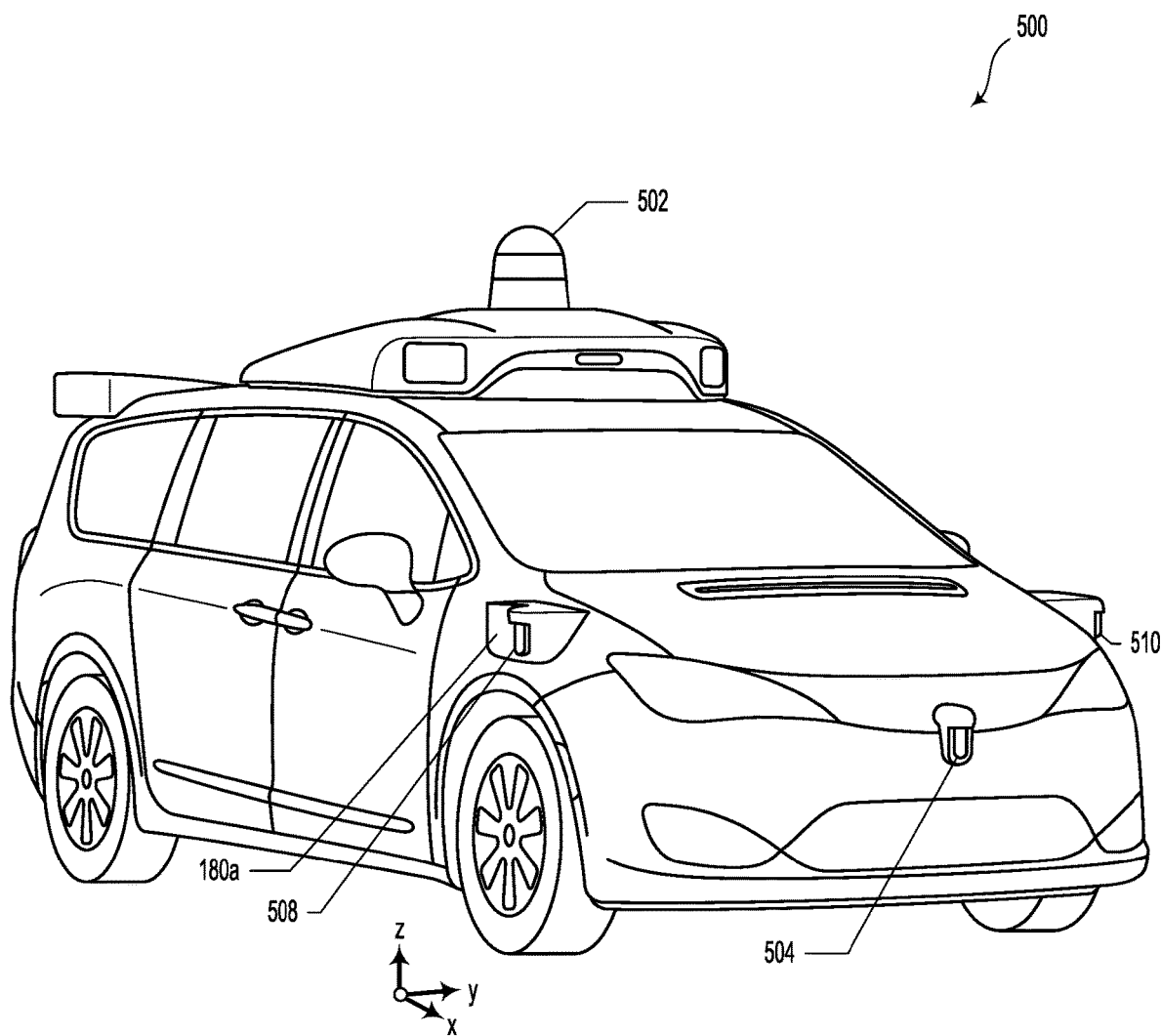
FIG. 5E illustrates a vehicle, according to an example embodiment.

In some embodiments, the reflective surface could include a portion of a body of the vehicle 500. For example, as illustrated in FIGS. 5A, 5B, and 5E, reflective surfaces 180*a* and 180*b* could located adjacent to a given lidar system (e.g., sensor systems 508 and 510, respectively).

In some embodiments, the reflective surface could include at least one of a rear view mirror of the vehicle or a side view mirror of the vehicle. Other reflective surfaces, including other body surfaces of the vehicle, are possible and contemplated.

As described in reference to FIG. 2, vehicle 500 could include one or more lidar systems (e.g., lidar system 200), each of which may include at least one light source configured to emit the light pulses. The emitted light pulses interact with the environment to provide return light pulses.

The lidar system includes at least one detector configured to detect at least a portion of the return light pulses. The lidar system also include a controller (e.g., controller 150) having at least one processor (e.g., processor 152) and at least one memory (e.g., memory 154). The at least one processor executes instructions stored in the at least one memory so as to carry out operations. In some embodiments, the operations include causing the at least one light source to emit the light pulses. The operations could additionally include receiving at least a first portion of the return light pulses from the default field of view as a first detected light signal. The operations could further include receiving at least a second portion of the return light pulses from the extended field of view as a second detected light signal. The operations yet further include determining, based on the first detected light signal and the second detected light signal, a point cloud indicative of objects within the default field of view and the extended field of view.

The operations additionally include receiving a reflection map. The reflection map could include reflection information about how the reflective surface reflects the light pulses into the extended field of view. In such scenarios, determining the point cloud could be further based on the reflection map. The reflection information could include at least one of: an angle of the reflective surface, a pose of the reflective surface, or information regarding surface curvature of the reflective surface.

In embodiments that include a controller, the operations could include determining, based on the return light pulses, one or more stair objects. The one or more stair objects could include individual steps of a staircase or other similar objects. It will be understood that other objects and/or obstacles (e.g., doors, hallways, pathways, gates, windows, thresholds, etc.) are contemplated within the scope of the present disclosure.

In such scenarios, in response to determining the one or more stair objects, the operations could include adjusting an operating behavior of the vehicle. For example, the operating behavior could be modified from a flat surface movement to a stair traversal movement. Other adjustments in operating behavior are possible and contemplated.

As described herein, the reflective surface could be disposed within two feet of the lidar system. Alternatively, the reflective surface could be disposed closer to, or farther from, the lidar system.

In some embodiments, at least a portion of the extended field of view could be disposed above the lidar system. Additionally or alternatively, at least a portion of the extended field of view could be disposed below the lidar system.

Figure 6:
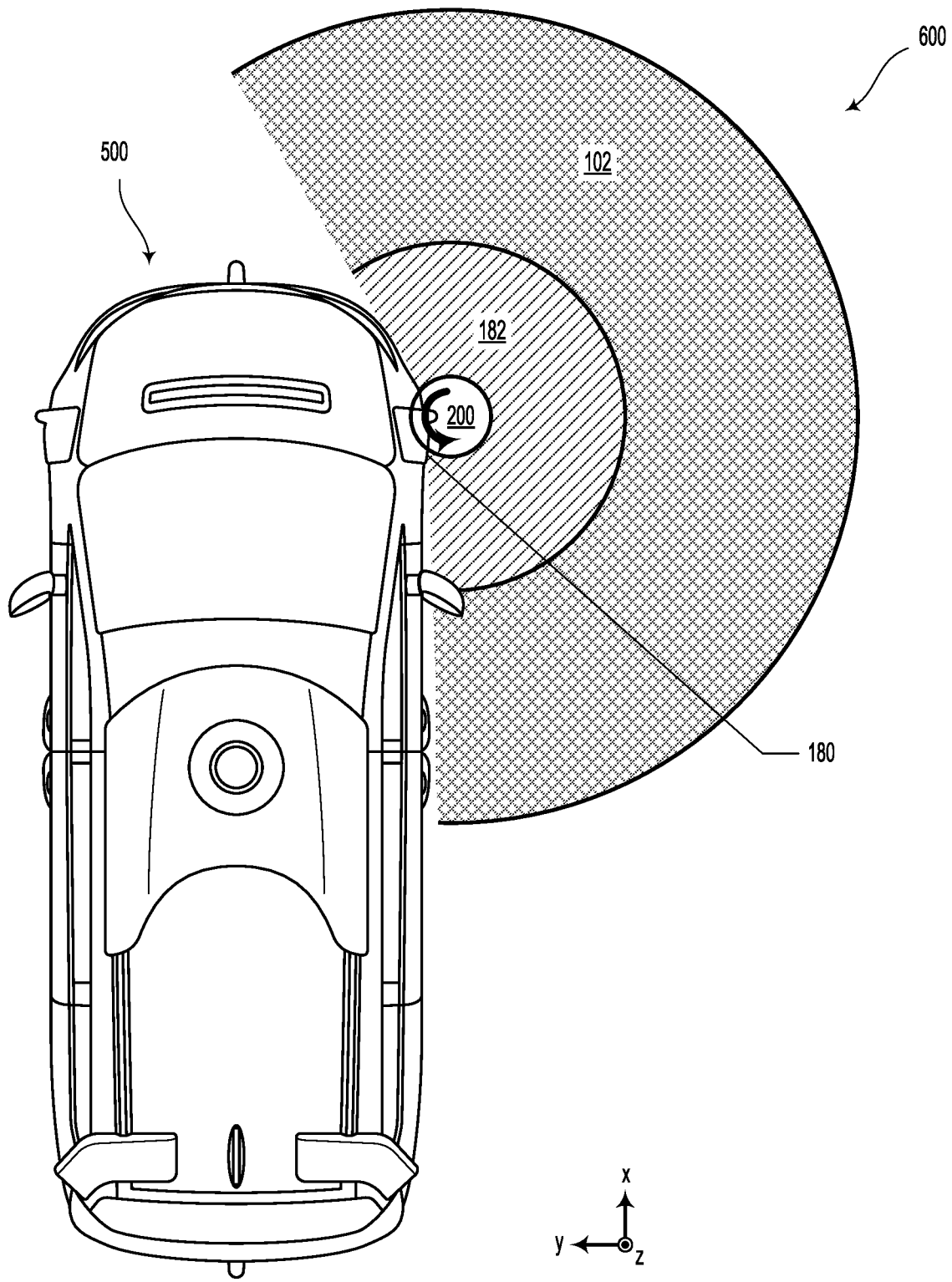
FIG. 6 illustrates an operating scenario, according to an example embodiment.

FIG. 6 illustrates a top view of an operating scenario 600, according to an example embodiment. The operating scenario 600 could include a lidar system 200 mounted along a right side of vehicle 500, along a front-right quarter panel. In an example embodiment, the lidar system 200 could rotate about a first axis (e.g., first axis 111 and/or the z-axis). While it is rotating about the first axis, lidar system 200 could emit light pulses into its environment by redirecting the light pulses with the rotating mirror assembly (e.g., mirror assembly 130). In such a scenario, at least some of the light pulses may interact with reflective surface 180 so as to reflect some light pulses toward the extended field of view 182.

FIG. 6 illustrates an example light emission pattern along a ground surface. As illustrated in FIG. 3, the light emission pattern along the ground could include a portion of a default field of view 102 and a portion of the extended field of view 182. While FIG. 6 illustrates the default field of view 102 and the extended field of view 182 as being non-overlapping, in some embodiments, at least a portion of the default field of view 102 could overlap with the extended field of view 182.

As illustrated in FIG. 6, the extended field of view 182 could provide detection of objects at close range to the vehicle 500 immediately below the lidar system 200. As such, the extended field of view 182 could be beneficial because it could provide lidar coverage in conventionally uncovered fields of view. Accordingly, the operating scenario 600 could illustrate a system with better safety than that of conventional systems.

IV. Example Methods

Figure 7:
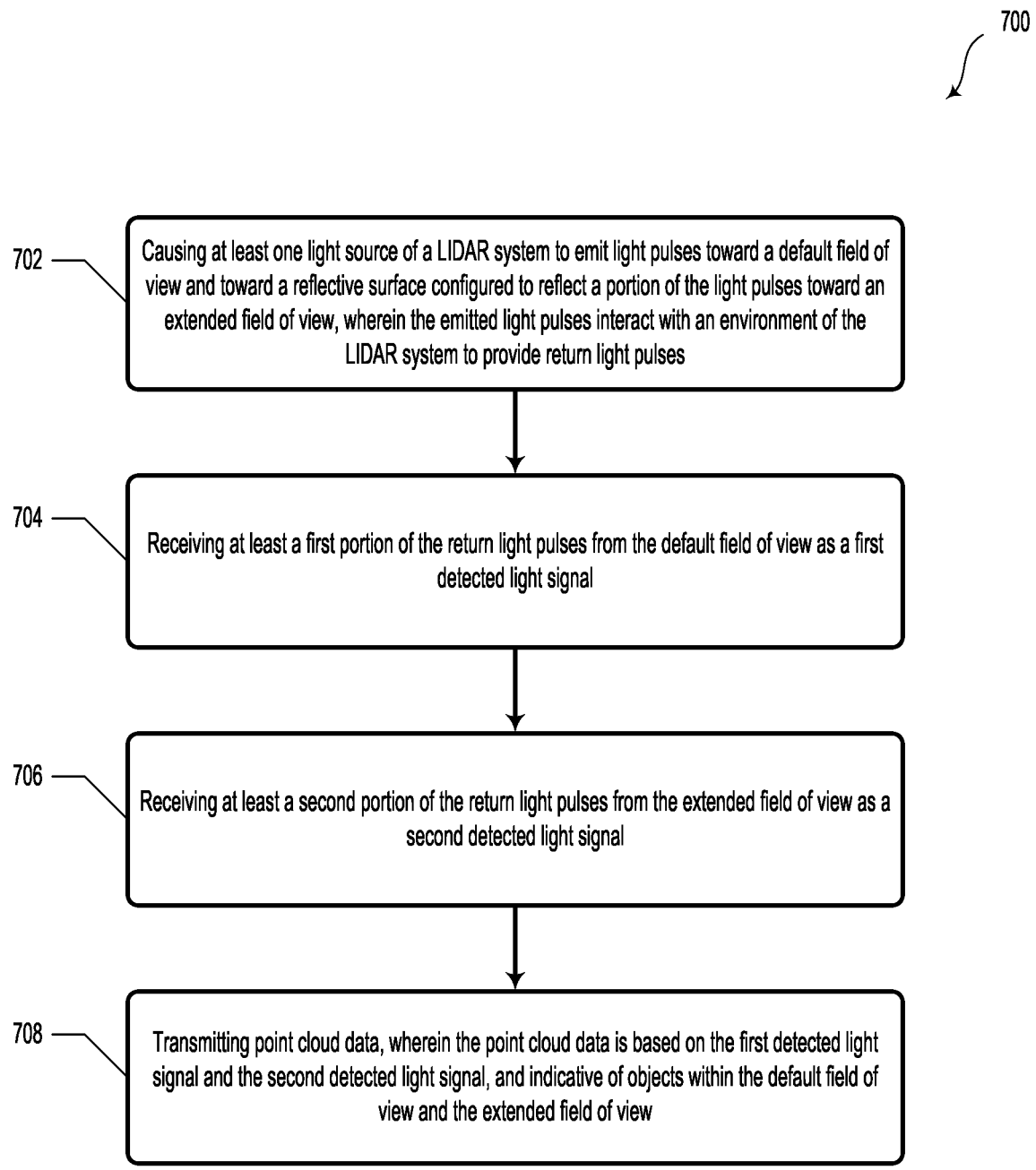
FIG. 7 illustrates a method, according to an example embodiment.

FIG. 7 illustrates a method 700, according to an example embodiment. It will be understood that the method 700 may include fewer or more steps or blocks than those expressly illustrated or otherwise disclosed herein. Furthermore, respective steps or blocks of method 700 may be performed in any order and each step or block may be performed one or more times. In some embodiments, some or all of the blocks or steps of method 700 may be carried out by controller 150 and/or other elements of systems 100, 300, 400 and lidar system 200 as illustrated and described in relation to FIG. 1, FIG. 3, FIG. 4, and FIG. 2A-2D, respectively.

Block 702 includes causing at least one light source (e.g., light-emitter device 126) of a lidar system (e.g., lidar system 200) to emit light pulses toward a default field of view (e.g., default field of view 102) and toward a reflective surface (e.g., reflective surface 180). The reflective surface could be configured to reflect a portion of the light pulses toward an extended field of view (e.g., extended field of view 182). The emitted light pulses interact with an environment of the lidar system to provide return light pulses.

Block 704 includes receiving at least a first portion of the return light pulses from the default field of view as a first detected light signal. In some embodiments, receiving the first portion of the return light pulses could include detecting reflected light pulses from the default field of view. The first detected light signal could be formed based on respective detections of the reflected light pulses by way of one or more detectors (e.g., photodetector 122).

Block 706 includes receiving at least a second portion of the return light pulses from the extended field of view as a second detected light signal. In some embodiments, receiving the second portion of the return light pulses could include detecting reflected light pulses from the extended field of view. The second detected light signal could be formed based on respective detections of the reflected light pulses by way of one or more detectors (e.g., photodetector 122).

Block 708 includes determining, based on the first detected light signal and the second detected light signal, a point cloud indicative of objects within the default field of view and the extended field of view. In some embodiments, determining the point cloud could include associating the first detected light signal and the second detected light signal with a plurality of spatial range points. For example, each spatial range point could be determined based on an emission angle and a time of flight between an initial firing time and a subsequent detection time for each respective light pulse.

In some embodiments, the extended field of view and the default field of view are not fully overlapping. For example, the default field of view could define at least one blind region. In such scenarios, the extended field of view could overlap with at least a portion of the at least one blind region.

In some embodiments, method 700 could additionally include receiving a reflection map. In examples, the reflection map could be received by the controller 150 by way of a wired or wireless communication interface. In some embodiments, the reflection map could be provided based on a calibration target and/or a calibration procedure. The reflection map could be stored in memory 154 or another local memory.

In some embodiments, the reflection map includes reflection information about how the reflective surface reflects the light pulses into the extended field of view. As an example, the reflection map could include a correspondence between an emission angle in elevation and azimuth and a reflected light pulse emission vector that intersects the extended field of view. In such scenarios, determining the point cloud could be further based on the reflection map.

In some examples, the reflection information could include at least one of: an angle of the reflective surface, a pose of the reflective surface, or a surface curvature of the reflective surface.

Additionally or alternatively, the reflection information could include a look up table (LUT). As an example, the LUT could include information indicative of: a default light pulse emission vector and a reflected light pulse emission vector.

The arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

While various examples and embodiments have been disclosed, other examples and embodiments will be apparent to those skilled in the art. The various disclosed examples and embodiments are for purposes of illustration and are not intended to be limiting, with the true scope being indicated by the following claims.

What is claimed is:

1. A system comprising:
   a lidar system comprising at least one light source configured to emit light pulses into an environment of the system toward a default field of view; and
   a reflective surface optically coupled to the lidar system, wherein the reflective surface is configured to reflect at least a portion of the emitted light pulses so as to provide an extended field of view, wherein the lidar system is configured to provide information indicative of objects within the default field of view and the extended field of view.

2. The system of claim 1, wherein the extended field of view and the default field of view are not fully overlapping.

3. The system of claim 1, wherein the default field of view defines at least one blind region, and wherein the extended field of view overlaps with at least a portion of the at least one blind region.

4. The system of claim 1, wherein the reflective surface comprises at least one of: a flat mirror, a convex mirror, a concave mirror, or a multifaceted mirror array.

5. The system of claim 1, wherein the reflective surface is physically coupled to the lidar system.

6. The system of claim 1, wherein the reflective surface is disposed within two feet of the lidar system.

7. The system of claim 1, further comprising:
   a controller comprising at least one processor and at least one memory, wherein the at least one processor executes instructions stored in the at least one memory so as to carry out operations, the operations comprising:
   causing the at least one light source to emit the light pulses;
   receiving at least a first portion of return light pulses from the default field of view as a first detected light signal;
   receiving at least a second portion of the return light pulses from the extended field of view as a second detected light signal; and
   determining, based on the first detected light signal and the second detected light signal, a point cloud indicative of objects within the default field of view and the extended field of view.

8. The system of claim 7, wherein the operations further comprise:
   receiving a reflection map, wherein the reflection map comprises reflection information about how the reflective surface reflects the light pulses into the extended field of view, wherein determining the point cloud is further based on the reflection map.

9. The system of claim 8, wherein the reflection information comprises at least one of: an angle of the reflective surface, a pose of the reflective surface, or a surface curvature of the reflective surface.

10. A method comprising
causing at least one light source of a lidar system to emit light pulses toward a default field of view and toward a reflective surface configured to reflect a portion of the light pulses toward an extended field of view, wherein the lidar system comprises at least one light source configured to emit the light pulses;
receiving at least a first portion of return light pulses from the default field of view as a first detected light signal;
receiving at least a second portion of the return light pulses from the extended field of view as a second detected light signal; and
transmitting point cloud data, wherein the point cloud data is based on the first detected light signal and the second detected light signal, and wherein the point cloud data is indicative of objects within the default field of view and the extended field of view.

11. The method of claim 10, wherein the extended field of view and the default field of view are not fully overlapping.

12. The method of claim 10, wherein the default field of view defines at least one blind region, and wherein the extended field of view overlaps with at least a portion of the at least one blind region.

13. The method of claim 10, further comprising:
receiving a reflection map, wherein the reflection map comprises reflection information about how the reflective surface reflects the light pulses into the extended field of view, wherein determining the point cloud is further based on the reflection map.

14. The method of claim 13, wherein the reflection information comprises at least one of: an angle of the reflective surface, a pose of the reflective surface, or a surface curvature of the reflective surface.

15. A vehicle comprising:
a lidar system comprising at least one light source configured to emit light pulses into an environment of the vehicle toward a default field of view; and
a reflective surface optically coupled to the lidar system, wherein the reflective surface is configured to reflect at least a portion of the emitted light pulses so as to provide an extended field of view, wherein the lidar system is configured to provide information indicative of objects within the default field of view and the extended field of view.

16. The vehicle of claim 15, wherein the reflective surface comprises a portion of a body of the vehicle.

17. The vehicle of claim 15, wherein the reflective surface is physically coupled to the lidar system.

18. The vehicle of claim 15, wherein the lidar system comprises:
a controller comprising at least one processor and at least one memory, wherein the at least one processor executes instructions stored in the at least one memory so as to carry out operations, the operations comprising:
causing the at least one light source to emit the light pulses;
receiving at least a first portion of return light pulses from the default field of view as a first detected light signal;
receiving at least a second portion of the return light pulses from the extended field of view as a second detected light signal;
transmitting point cloud data, wherein the point cloud data is based on the first detected light signal and the second detected light signal, and indicative of objects within the default field of view and the extended field of view; and
receiving a reflection map, wherein the reflection map comprises reflection information about how the reflective surface reflects the light pulses into the extended field of view, wherein the point cloud data is further based on the reflection map, wherein the reflection information comprises at least one of: an angle of the reflective surface, a pose of the reflective surface, or a surface curvature of the reflective surface.

19. The vehicle of claim 15 further comprising:
a controller comprising at least one processor and at least one memory, wherein the at least one processor executes instructions stored in the at least one memory so as to carry out operations, the operations comprising:
causing the at least one light source to emit the light pulses;
receiving at least a first portion of return light pulses from the default field of view as a first detected light signal;
receiving at least a second portion of the return light pulses from the extended field of view as a second detected light signal;
determining, based on the return light pulses, one or more stair objects; and
in response to determining the one or more stair objects, adjusting an operating behavior of the vehicle.

20. The vehicle of claim 15, wherein the reflective surface is disposed within two feet of the lidar system.

* * * * *